United States Patent
Lowry (10) Patent No.: US 8,433,805 B2
(45) Date of Patent: Apr. 30, 2013

(54) METHOD AND SYSTEM FOR FACILITATING CONTACTING PEOPLE USING ELECTRONIC DEVICES

(75) Inventor: Thomas Ethan Lowry, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 569 days.

(21) Appl. No.: 12/234,429

(22) Filed: Sep. 19, 2008

(65) Prior Publication Data

US 2010/0077033 A1    Mar. 25, 2010

(51) Int. Cl.
*G06F 15/16*    (2006.01)
*H04L 12/28*    (2006.01)
*H04W 24/00*    (2009.01)
*H04W 4/00*    (2009.01)

(52) U.S. Cl.
USPC ........ 709/227; 709/206; 370/351; 455/456.1; 455/456.3; 455/435.1; 455/435.3

(58) Field of Classification Search .................. 709/227
See application file for complete search history.

(56) References Cited

U.S. PATENT DOCUMENTS

| | | | | |
|---|---|---|---|---|
| 6,463,462 B1 * | 10/2002 | Smith et al. | ................. | 709/206 |
| 6,611,516 B1 * | 8/2003 | Pirkola et al. | ................. | 370/352 |
| 6,671,508 B1 * | 12/2003 | Mitsuoka et al. | ......... | 455/412.1 |
| 6,807,423 B1 * | 10/2004 | Armstrong et al. | .......... | 455/440 |
| 7,010,292 B2 * | 3/2006 | Jerbi et al. | ................. | 455/414.1 |
| 7,701,925 B1 * | 4/2010 | Mason et al. | ................. | 370/352 |
| 7,801,284 B1 * | 9/2010 | Chakra et al. | ............. | 379/88.03 |
| 2002/0035556 A1 * | 3/2002 | Shah et al. | ........................ | 707/1 |
| 2002/0049610 A1 * | 4/2002 | Gropper | ............................ | 705/1 |
| 2002/0052921 A1 * | 5/2002 | Morkel | ......................... | 709/206 |
| 2002/0184089 A1 * | 12/2002 | Tsou et al. | ....................... | 705/14 |
| 2003/0023691 A1 * | 1/2003 | Knauerhase | .................. | 709/206 |
| 2003/0217109 A1 * | 11/2003 | Ordille et al. | ................. | 709/206 |
| 2004/0006601 A1 * | 1/2004 | Bernstein et al. | ............. | 709/207 |
| 2004/0054428 A1 * | 3/2004 | Sheha et al. | ..................... | 700/56 |
| 2004/0068519 A1 * | 4/2004 | Smukler et al. | ............ | 707/104.1 |
| 2004/0122896 A1 * | 6/2004 | Gourraud | ...................... | 709/204 |
| 2004/0158618 A1 * | 8/2004 | Shaw | ............................ | 709/217 |
| 2004/0223485 A1 * | 11/2004 | Arellano et al. | .............. | 370/351 |
| 2004/0249910 A1 * | 12/2004 | Jerbi et al. | ...................... | 709/222 |
| 2004/0260749 A1 * | 12/2004 | Trossen et al. | ................ | 709/200 |
| 2005/0071237 A1 * | 3/2005 | Caspi et al. | ...................... | 705/25 |
| 2005/0083904 A1 * | 4/2005 | Khartabil et al. | ............. | 370/351 |
| 2005/0091327 A1 * | 4/2005 | Koch | ............................ | 709/206 |
| 2005/0165914 A1 * | 7/2005 | Moore et al. | .................. | 709/219 |
| 2005/0175021 A1 * | 8/2005 | Ozugur et al. | ................ | 370/352 |

(Continued)

OTHER PUBLICATIONS

Friedlander et al. Are You There? Reflections on Presence Server Architectures, Bell Labs Technical Journal 10(4), 77-82 (2006).*

(Continued)

*Primary Examiner* — Emmanuel L Moise
*Assistant Examiner* — Robert Shaw
(74) *Attorney, Agent, or Firm* — Wong, Cabello, Lutsch, Rutherford, Brucculeri, LLP.

(57) ABSTRACT

Methods and apparatus, including computer program products, implementing and using improved approaches to contact users that can be contacted in a variety of different ways are disclosed. According to one aspect, one user is able to be automatically informed of an appropriate (e.g., preferred) way to contact another user. Once informed of the appropriate way, another user can be contacted (automatically or on user request) using the appropriate way.

18 Claims, 7 Drawing Sheets

U.S. PATENT DOCUMENTS

| | | | |
|---|---|---|---|
| 2006/0146997 A1* | 7/2006 | Qian et al. | 379/88.16 |
| 2006/0174002 A1* | 8/2006 | Shrinivasan et al. | 709/225 |
| 2006/0190591 A1* | 8/2006 | Bobde et al. | 709/224 |
| 2007/0069888 A1* | 3/2007 | Parameswar | 340/539.13 |
| 2007/0100940 A1* | 5/2007 | Eriksson | 709/204 |
| 2007/0167170 A1* | 7/2007 | Fitchett et al. | 455/456.1 |
| 2007/0294397 A1* | 12/2007 | Kunz | 709/224 |
| 2008/0088428 A1* | 4/2008 | Pitre et al. | 340/506 |
| 2008/0091728 A1* | 4/2008 | Diederiks et al. | 707/104.1 |
| 2008/0133526 A1* | 6/2008 | Haitani et al. | 707/7 |
| 2008/0133580 A1* | 6/2008 | Wanless et al. | 707/102 |
| 2008/0133708 A1* | 6/2008 | Alvarado et al. | 709/218 |
| 2008/0147639 A1* | 6/2008 | Hartman et al. | 707/5 |
| 2008/0148154 A1* | 6/2008 | Burrell et al. | 715/733 |
| 2008/0174421 A1* | 7/2008 | Londhe | 340/539.13 |
| 2008/0256192 A1* | 10/2008 | Pinard et al. | 709/206 |
| 2008/0318592 A1* | 12/2008 | Mandalia | 455/456.1 |
| 2009/0144634 A1* | 6/2009 | Berger | 715/747 |
| 2010/0071053 A1* | 3/2010 | Ansari et al. | 726/12 |

OTHER PUBLICATIONS

Han et al., A Study on SIP-based Instant Message and Presence, ICACT2007, Feb. 12-14, 2007, pp. 1298-1301.*

Wu and Schulzrinne, Location-based Services in Internet Telephony, Second IEEE Consumer Communications and Networking Conference, 2005, pp. 331-336.*

Brok et al., Enabling New Services by Exploiting Presence and Context Information in IMS, Bell Labs Technical Journal 10(4), 83-100 (2006).*

Brok et al., "Enabling New Services by Exploiting Presence and Context Information in IMS", Bell Labs Technical Journal 10(4), 83-100 (2006).*

Han et al., A Study on SIP-based Instant Message and Presence, ICACT2007, Feb. 12-14, 2007, pp. 1298-1301.*

Shacham et al., Composition for Enhanced SIP Presence, 1-4244-1521-7/07, IEEE 2007.*

Schulzrinne and Wu, Location-based Services in Internet Telephony, Second IEEE Consumer Communications and Networking Conference, 2005, pp. 331-336.*

Friedlander et al., "Are You There? Reflections on Presence Server Architectures", Bell Labs Technical Journal 10(4 (2006), pp. 77-82.*

Schulzrinne et al RFC 4480 "RPID: Rich Presence Extensions to the Presence Information Data Format (PIDF)" Jul. 2006.*

* cited by examiner

METHOD AND SYSTEM FOR FACILITATING CONTACTING PEOPLE USING ELECTRONIC DEVICES

BACKGROUND OF THE INVENTION

Recent developments in the communications technology area have made it possible to contact people in a variety of ways. A decade or two ago, the most common means for contacting people was by mail, personal meetings, or telephone conversations. These days, however, there is also a variety other options, such as e-mail, mobile phones, text chat, video chat, office phone, home phone, just to mention a few.

While the advent of these new technologies has increased the availability of people, it has also created a problem for people who are trying to initiate contact with someone, since the person trying to initiate contact may not know what the best way would be to reach the other person at any given time. For example, the other person might be at his office desk, in his car, at home, in a meeting, or somewhere else. At each of these places there may be more or less appropriate ways of being contacted.

Some solutions for dealing with such issues have been developed on an application or device basis. For example, chat applications typically allow a user to manually set a status, such as "available," "busy," or "away from my desk," and so on. Users can also typically set up so called "auto-responders" in their email systems, which automatically send an automatic reply message whenever a message is received, informing the sender that the recipient, for example, is out on vacation. Telephone calls can also be set manually by a user to be directed to voicemail, where a message is played to the caller, informing the caller about the recipient's current status, and so on. All of these systems have in common that they must be set or reset manually by a user.

One approach, albeit inefficient, can send a ping to all the places where a recipient can be reached, and wherever the recipient happens to be, he answers the ping through an appropriate device. A drawback with such systems is that they are often noisy and bother other people, for example, if the office phone keeps ringing, while the chat application on the user's computer beeps and the email system signals an incoming email, and so on.

Another solution can have a recipient define a static fall-over list. This list can contain instructions, for example, to first try to call the office phone, and if no one answers, try the mobile phone, then e-mail, and so on. A drawback to this solution is that the caller might not be aware that such a fall-over list exists, and subsequently assume that the recipient is not available and hang up after a short time, that is, before the fall-over list has been completely processed.

Thus, there remains a need for better mechanisms for assisting people to contact one another.

SUMMARY OF THE INVENTION

The invention pertains to improved approaches to contact users that can be contacted in a variety of different ways. According to one aspect, one user is able to be automatically informed of an appropriate (e.g., preferred) way to contact another user. Once informed of the appropriate way, another user can be contacted (automatically or on user request) using the appropriate way.

The invention can be implemented to include one or more of the following advantages. A contactor does not have to know at every given time the best way to contact a contactee. There can be a built-in transparency (e.g., for privacy or other reasons), so that a contactor does not know why a contactee should be contacted in a particular way; the contactor only knows that at a given time, there is a certain preferred way to contact the contactee. The preferred way of contacting someone can be automatically selected, so that the contactor only needs to select a contactee on her device, and the device can automatically use the preferred method of contacting the selected contactee, depending on the device's capabilities. Different priorities (or preferences) can be defined by the contactee for different contactors and different situations, such as different times or different locations. The contactee can choose the amount of information to be made available for determination of the preferred way of being contacted. No manual input from users is necessary, except for perhaps an initial configuration of their information. Various embodiments of the invention can be implemented as a centralized remote service, or a local application on the users' devices.

The invention can be implemented in numerous ways, including as a method, system, device, apparatus (including graphical user interface or computer readable medium). Several embodiments of the invention are discussed below.

As a computer-implemented method for determining a preferred method of contacting a contactee, one embodiment of the invention can, for example, provide a contacting service connected to a network. The contacting service being operable to: collect data pertaining to the contactee from one or more contacting devices connected to the network; store the collected data; receive a request from a contactor to initiate contact with a contactee; determine, based on multiple variables derived from the collected data, a preferred method of contacting the contactee; and facilitate establishment of contact between the contactor and the contactee using the preferred method.

As a method for contacting others via communication devices, one embodiment of the invention can, for example, include at least: receiving an identification of a second user to be contacted by a first user; determining an appropriate method for contacting the second user, the appropriate method being one of a plurality of appropriate methods that are available for use to contact the second user, and the appropriate method being determined based on monitoring data pertaining to (i) the status of the second user, or (ii) status of one or more electronic communication devices associated with the second user; and informing the first user of the appropriate method for contacting the second user.

As a method for dynamically maintaining communication status for a plurality of users, one embodiment of the invention can, for example, include at least: receiving information concerning status associated with a plurality of users; and determining appropriate communication methods to contact the users based on the received information concerning the status.

As a computer program product, stored on a machine-readable medium, including at least executable computer program code for determining an appropriate method of contacting a contactee, one embodiment of the invention can, for example, include at least: computer program code for collecting data pertaining to the contactee from one or more contacting devices connected to the network; computer program code for storing the collected data; computer program code for receiving a request from a contactor to initiate contact with a contactee; computer program code for determining, based on multiple variables derived from the collected data, an appropriate method of contacting the contactee; and computer program code for facilitating establishment of contact between the contactor and the contactee using the appropriate method.

These and other aspects and advantages of one or more embodiments of the invention will become apparent from the following detailed description and claims taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to contact users that can be contacted in a variety of different ways. According to one aspect, one user is able to be automatically informed of an appropriate (e.g., preferred) way to contact another user. Once informed of the appropriate way, another user can be contacted (automatically or on user request) using the appropriate way.

Advantageously, once configured, monitoring of the persons can be performed automatically (or dynamically) without user participation. Users can also configure preferences or priorities so that the communication method selected for communications can be controlled. As an example, the preferences or priorities can be used to give friends and relatives greater access, than business acquaintances.

Reference will be made herein to "contactors" and "contactees." A contactor, as defined herein, is a person who is attempting to initiate contact with a contactee. Consequently, a "contactee" is a person who is being contacted. Further, it should be noted that while reference will be made below by way of example to communication methods such as email, telephone, text chat, video chat, personal meetings, and so on, other communications methods can also be included within the scope of the invention.

Overview

Figure 1:
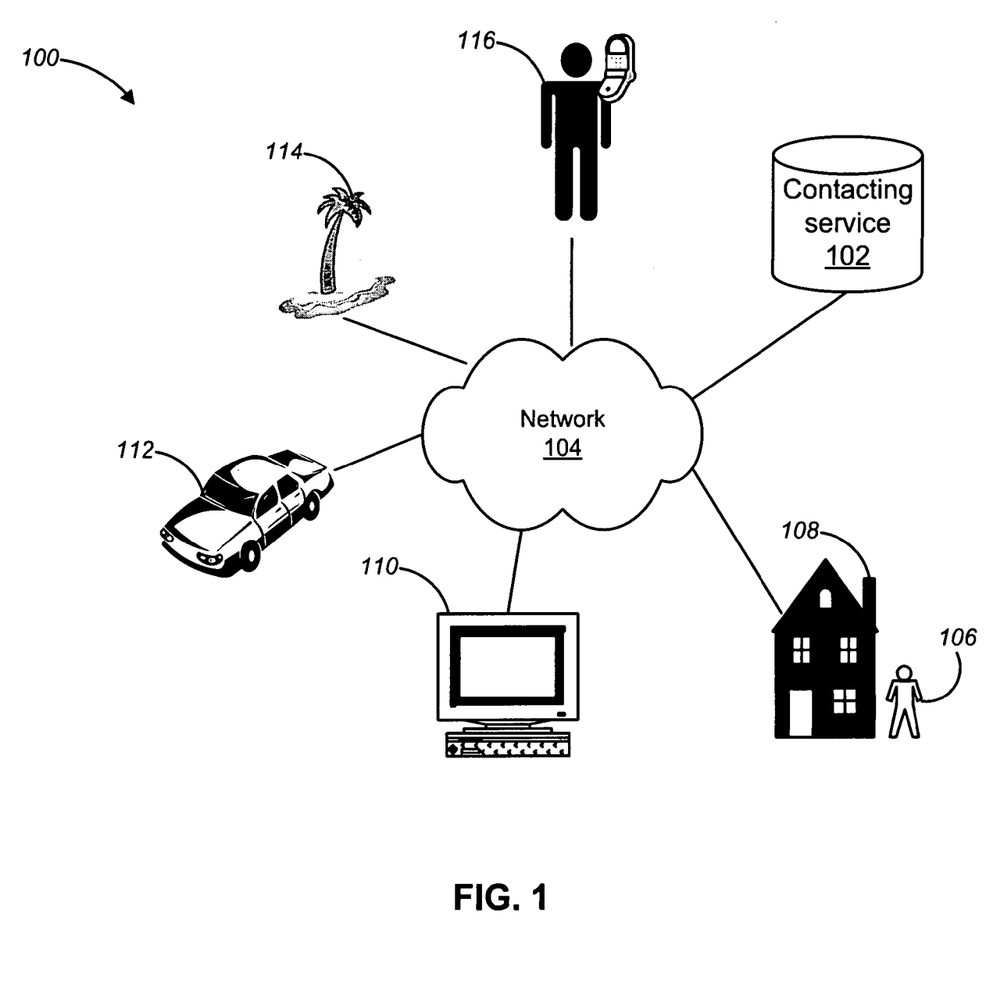
FIG. 1 shows a schematic overview of a system in accordance with one embodiment of the invention.

An overview of a system (100) in accordance with one embodiment of the invention will be presented with respect to FIG. 1. As shown in FIG. 1, the system (100) includes a contacting service (102) and a network (104). Details of the contacting service (102) and the network (104) will be discussed in further detail below. For now, however, the important things to note are that the contacting service (102) contains data, entered by a contactee (106) about how the contactee (106) would prefer to be contacted under particular circumstances, such as when the contactee (106) is in a particular location. Some exemplary locations are shown in FIG. 1 as when the contactee (106) is at home (108), at work (110), in his car (112), or on vacation (114). While only one contactee (106) is shown in FIG. 1 for the sake of simplicity, it should be noted that the contacting service (102) will typically contain data about several hundreds or thousands of contactees (106).

The network (104) has the capability of communicating with the various locations (108-114) and detecting (including estimating) at which location the contactee (106) is at any given moment. For example, a GPS (Global Positioning System) device in the contactee's mobile phone or in his car can provide data about the contactee's whereabouts to the network (104), which can subsequently transmit that information to the contacting service (102). Data received from the contactee's work computer (110), such as keyboard or mouse entries, may indicate that the contactee (106) is currently in his office, and so on. The extent to which these detection mechanisms are used can be configured by the contactee (106) when setting up a personal profile in the contacting service (102), as will be discussed in further detail below.

As a result of these detection mechanisms and the data stored in the contacting service (102), the contacting service (102) contains, at any given point in time, information about the contactee's likely location. In one embodiment, when a contactor (116) is trying to reach the contactee (106), he only needs to push a button, for example, in the contact list on his mobile phone that indicates that he would like to contact the contactee. A contact request can then be sent over the network (104) to the contacting service (102), which either informs the contactor (116) of the preferred way to reach the contactee (106), or directly connects the contactor (116) to the contactee (106) using the preferred method. It should be noted that the contactor (116) need not know why a particular method of contacting the contactee (106) will be used. The contactor (116) need only know which method to preferably use at a given point in time.

As can be realized by those of ordinary skill in the art, a contactor (116) need not make a decision about which contacting method to use when desirous of contacting the contactee (106). Instead, the contacting service (102) guides the contactor (116) to contact the contactee (106) in an appropriate manner given the situation (e.g., position) of the contactor (116). This is advantageous to both the contactor (116) and the contactee (106). For the contactor (116), the contacting service (102) enhances the chances that the contactee (106) is actually reached by the contactor (11 6). For the contactee (106), the contacting service (102) can serve to cause contact to be made from various different contactors in an appropriate manner.

Configuring the Contacting Service

Figure 2:
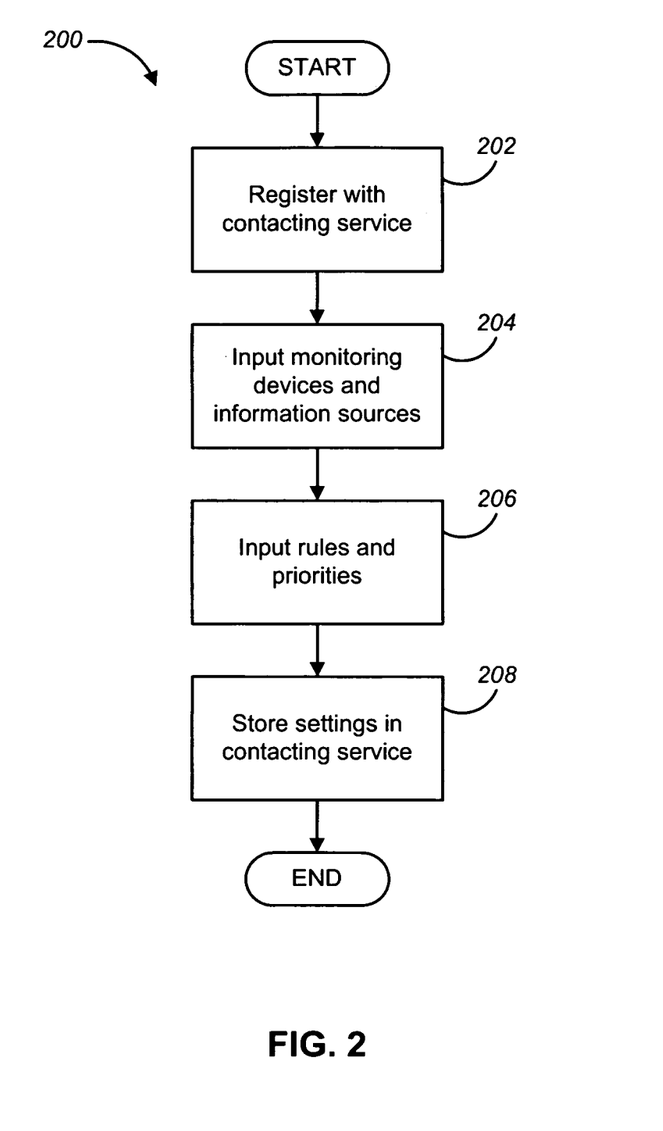
FIG. 2 shows a flowchart of a process for configuring personal information in the contacting service in accordance with one embodiment of the invention.

FIG. 2 shows a flowchart of a process for configuring personal information in the contacting service (102) in accordance with one embodiment of the invention. Typically, the configuration can be done by accessing the contacting service (102) over the Internet, entering information through a user interface including one or more input screens, and submitting the information to the contacting service (102).

First, the user registers with the contacting service (102) (step 202). The registration typically involves inputting some personal information, and accepting the conditions for using the service, and so on. Next, the user specifies which monitoring devices may be used, and what other information sources may be made available to the contacting service (102) as basis for determination of an appropriate way (e.g., preferred way) to contact the user (step 204).

One example of a monitoring device that can be used by the contacting service (102) is a Global Positioning System (GPS) device, such as a mobile telephone with GPS capabilities. The GPS device can provide information to the contacting service (102) about physical location of a contactee (106). The contactee (106) might also enter data into the contacting service about which physical locations correspond to the contactee's office (110), home (108), favorite vacation spot (114), and so on. In one embodiment, the contacting service (102) can know (or estimate) where the contactee is at any given time. The GPS device can also provide movement information. For example, if the contactee (106) is moving at a speed of 65 mph along a freeway, it is likely that the contactee is in his car, and it might not be a good idea to contact the contactee (106) by mobile phone, but instead it could be better to use SMS (Short Message Service), send the contactee (106) an email, or simply wait and initiate contact with the contactee (106) at a different occasion. If the contactee (106) is moving at a speed of 150 mph along a railway line, then it can be assumed with reasonable certainty that the contactee (106) is on a high speed train, and that it is fine to contact the contactee (106) by mobile phone, and so on.

Other examples of monitoring devices that can be used by the contacting service (102) are home computers and office computers (110), or home phones or office phones. If it is determined that the contactee's office computer (110) is in use, for example, by detecting keyboard strokes or computer mouse activities, it can be assumed that the contactee (106) is at his office computer, and the best way of contacting him might be through e-mail, chat, video chat, or some similar mechanism, or even through his office phone. If it is determined that the office phone is in use, maybe an email would be the best way of contacting the contactee, and so on. Similar principles can be applied to home computers or home phones.

Another example of a monitoring device is a microphone, such as a microphone at a contactee's office. The microphone can be coupled to or part of a office computer or office phone. When the microphone at the contactee's office picks up audio sound indicative of a conversation, the best way of contacting the contactee is probably not through the office phone or video.

Yet another example of monitoring devices that can be used by the contacting service (102) are web cameras. The contactee (106) might, for example, have a web camera in his office that can take occasional snapshots (images). Based on the snapshot, various likelihoods of the contactee (106) being in the office can be determined. For example, if the contactee (106) can be identified in a recent snapshot, it is likely that he will be in the office. If the snapshot instead shows an empty office where the lights are on, the contactee can be in the office, but might have stepped out for a break, or he could have left the office for the day and forgotten to turn the lights off.

One example of an information source that can be used by the contacting service (102) to determine a likely location of a contactee (106) is the contactee's electronic calendar, which is commonly stored on the contactee's computer or mobile phone. The calendar can provide information relating to the contactee's schedule, such as meetings, appointments, vacations, lunch hours, approximate work hours, and so on.

Another information source that can be used by the contacting service (102) to determine a likely location of a contactee (106) is the contactee's email status. For example, if a contactee (106) has not read his emails for some time, it is reasonably likely to assume that the contactee (106) is not currently at his office or home computer. On the other hand, if it is determined that the contactee checked his email 30 seconds ago from a particular computer, then it would be reasonably safe to assume that the contactee is still at that location.

Next, the contactee (106) can enter a set of rules and priorities (step 206). These rules and priorities determine parameters for who may contact the contactee (106) at given times and locations. For example, in some embodiments, there can be different tiers with which various groups of people can be associated, and for which different contacting rules can be determined. Assume for example that the contactee's boss is in the Tier 1 group, and that it is after work hours. When the boss tries to contact the contactee (106), the contacting service (102) knows that it is the boss who is calling and that the contactee (106) is likely at home (108), and consequently can route the telephone call to the contactee's home phone. On the other hand, if the contactor (116) is an unknown person, they may be placed in the Tier 3 group and thus instead can be routed to e-mail. If the contactor (116) is a friend, they may be placed in the Tier 2 group, and can reach the contactee (106) by SMS-message, for example. Many variations to these rules and priorities can be envisioned by those of ordinary skill in the art.

In some embodiments, the contactee (106) can also enter relational information about contactors (116). For example, the contactee (106) can input the name of his boss, his boss's boss, and so forth so that different priorities can be given to different individual contactors (116), as well as to groups of contactors (116) as described above.

Finally, the settings are stored with the contacting service (102) (step 208). The settings are or pertain to the monitoring devices, information sources, rules and/or priorities. This completes the process (200).

It should be noted that while the above configuration is "static," in a sense, there are embodiments of the invention in which the configuration also can occur dynamically. For example, the contacting service (102) can detect or be notified that the contactee (106) has entered a new calendar entry in his calendar and take into account the priority information that the contactee (106) is entering about the calendar entry.

Another example of dynamic configuration is that the system (100) can store location information and identify new locations where the contactee (106) is spending considerable time. The contacting service (102) can ask the contactee (106) to identify the location and ask how the contactee (106) would like to be contacted at that particular location. The contactee (106) can respond, for example, "This is my massage therapist, and please never bother me here. Route all my incoming communications directly to email." Besides new locations, the system (100) can also recognize and store information pertaining to new events or new contacts. Here, the contacting service (102) can ask the contactee (106) to identify the event and ask how the contactee (106) would like to be contacted at that particular event. Alternatively, for new contacts, the contacting service (102) can ask the contactee (106) to identify the contact and ask how the contactee (106) would like to be contacted by the particular contact.

The system (100) can also occasionally prompt the contactee (106) for feedback on how well the system (100) is managing contacting the contactee (106). The feedback requested can be with reference to specific contactors, locations, time of day, etc. The system (100) can use the feedback to alter its contact management.

Alternatively, the tier group to which contactors (116) can be dynamically altered. For example, if a contractor (116) has a disproportionate number of failed connection attempts with respect to the contactee (106), the Tier group assigned to the contactor (116) can be lowered, in general or with respect to a particular location.

Furthermore, the more information that is available for or entered by the contactee (106), the better will be the possibilities of the system (100) to make accurate predictions about the contactee's whereabouts and preferred communication methods. Given the considerable amount of personal information that can be stored in the contacting service (102), it is important that various security features are implemented on the contacting service (102), so that the service is secure and that the contactee's information cannot be accessed by unauthorized users.

Contacting a Contactee

Figure 3:
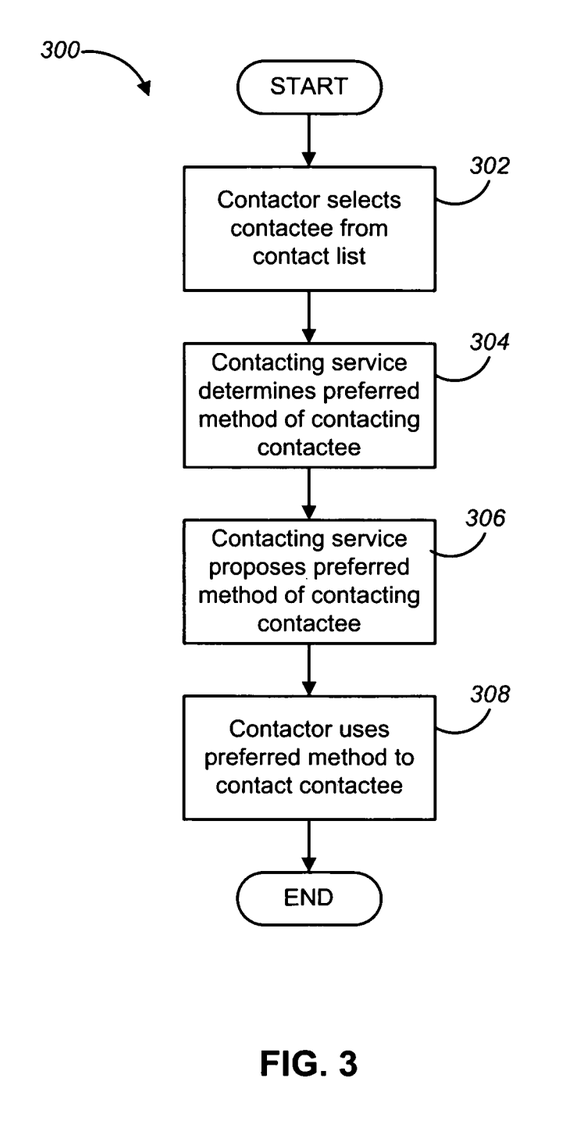
FIG. 3 shows a flowchart of a process for how a contactor can initiate contact with a contactee in accordance with one embodiment of the invention.

FIG. 3 shows a flowchart of a process (300) for a how a contactor (116) can initiate contact with a contactee (106) in accordance with one embodiment of the invention. As can be seen in FIG. 3, the process (300) starts by a contactor (116) selecting a contactee (106) from a contact list on his device (step 302). For example, the contactor (116) might select a contactee in an address book on his computer or on his mobile telephone.

Next, the contactor's (116) device can contact the contacting service (102), which determines what the appropriate (e.g., preferred) way would be of contacting the contactee (106) (step 304). The determination can be typically based on the information input by the contactee (106) and other information received from various devices and/or other information sources, as described above. It is important to note that more than one variable can be taken into account in making the determination. In one embodiment, a number of variables are taken into consideration in determining an appropriate (e.g., preferred) way of initiating contact. In some embodiments, different weights can also be assigned to different variables of the determination. For example, a calendar entry (if one is present) may be given a middle weighting in making the determination, as the contactee (106) likely would be in a meeting. Of course, if the system (100) at the same time detects that there is some activity going on at the contactee's computer (which may be given a high rating), then it might be reasonable to assume that the meeting has been canceled and that the contactee (106) is actually in his office.

After making the determination about the appropriate (e.g., preferred) way of contacting the contactee (106), the contacting service (102) can send a message to the contactor (116) with the appropriate (e.g., preferred) method of contacting (step 306). For example, the contacting service (102) can, for example, detect that the contactor (116) and contactee (106) are located only a short distance from each other, and propose that the contactor (116) simply walks over to the contactee (106) and meets with him in person. As another example, the contacting service (102) can detect that the contactor (11 6) and the contactee (106) are good friends (for example, by detecting that the contactor is in Tier 2 of the contactee's list), and maybe initiate a SMS or chat between the two, provided that both the contactor (116) and the contactee (106) have the appropriate technical equipment, and so on.

Finally, the contactor (116) uses the appropriate (e.g., preferred) method of contacting the contactee (106) (step 308). In some embodiments, the contactor (116) can override the suggestion, for example, if the contactor (116) knows that the suggested method by the contacting service (102) is not accurate. In other embodiments, the contactor (116) can be forced to use the suggested appropriate method of contacting the contactee (106), or simply wait until a later time, when different methods might be available. It should be noted that depending on the capabilities of the contactor's device, steps 306 and 308 can be performed automatically by the device, as will be discussed in further detail below.

Exemplary Graphical User Interface

Figure 4:
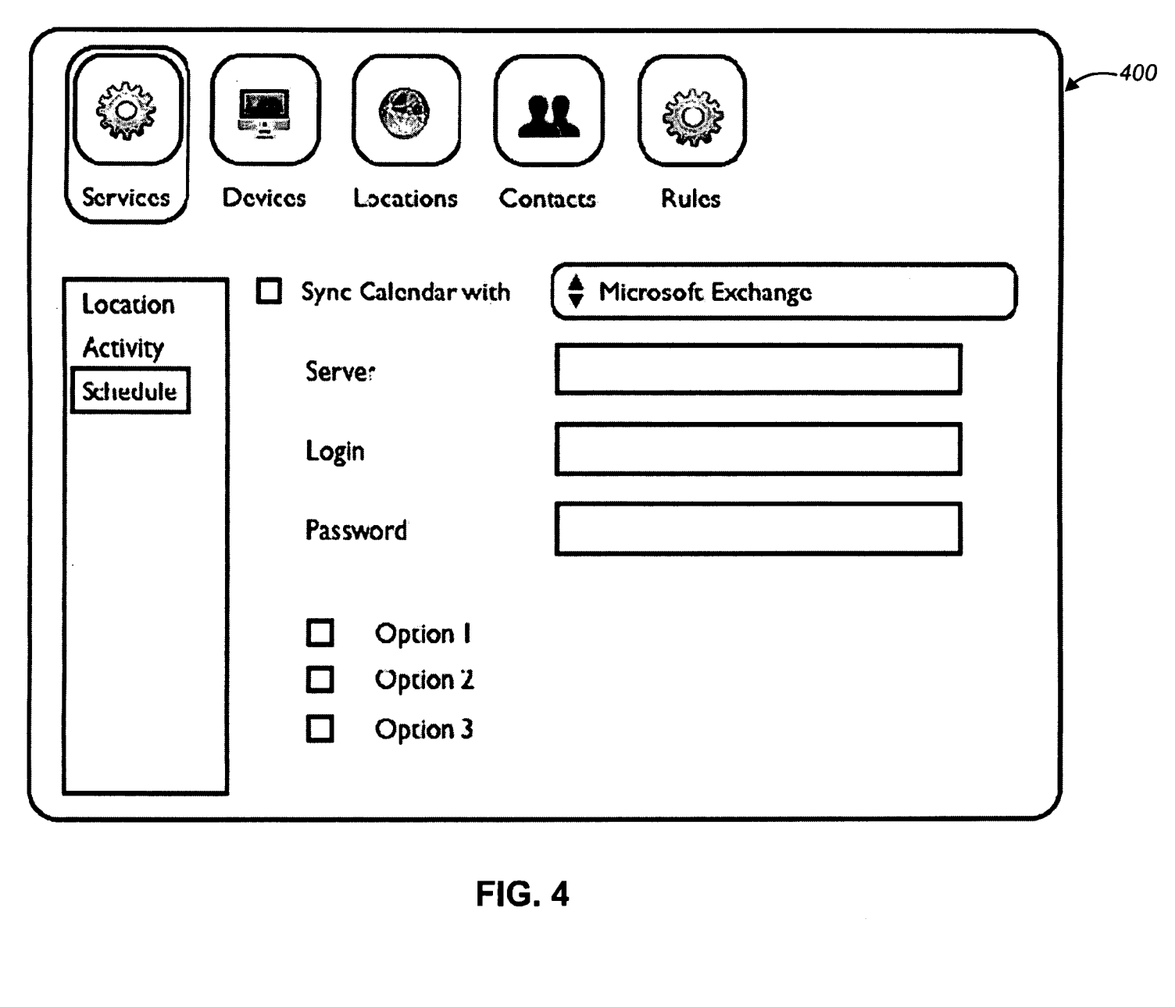
FIG. 4 is an exemplary user configuration screen according to one embodiment of the invention.

As noted above, the system (100) can use the contacting service (102) to manage contacting others in appropriate ways. A user (contactee) can configure the contacting service (102) over the Internet through use of a graphical user interface. FIG. 4 is an exemplary user configuration screen 400 according to one embodiment of the invention. The user input screen 400 can enable a user to designate as well as give permission to access services that provide information to the system (100). For example, the services can provide information, such as: (i) a scheduling/calendaring data (e.g., via Microsoft Exchange), (ii) a location information (e.g., GPS receiver), and/or (iii) activity information (e.g., computer or phone usage). The user configuration inputs provided by the user input screen 400 can be submitted to the contacting service (102) so that the contacting service (102) is able to access the information available from the services.

Figure 5:
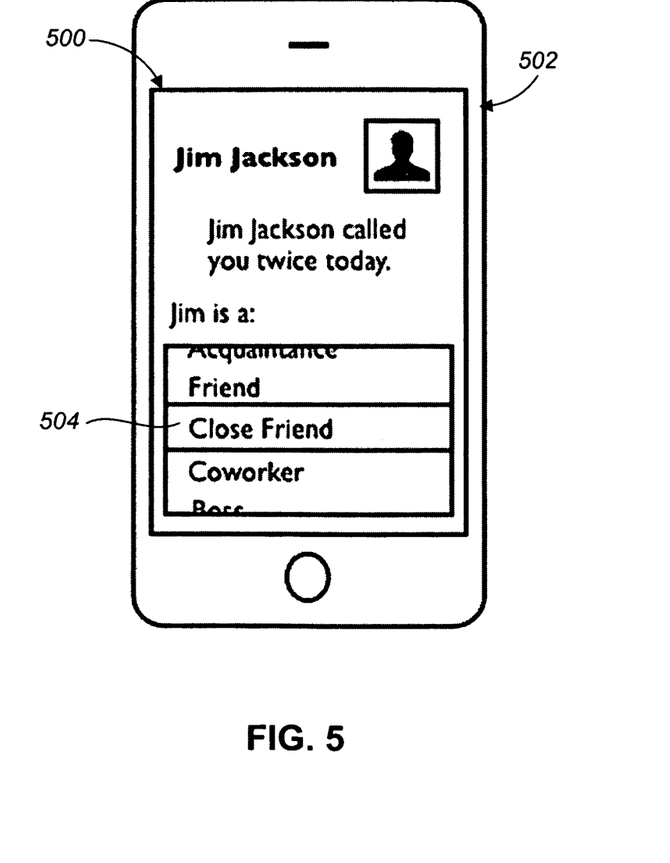
FIG. 5 is an exemplary user notification screen according to one embodiment of the invention.

FIG. 5 is an exemplary user notification screen 500 according to one embodiment of the invention. The user notification screen 500 can represent an automatic notification presented to a contactee. In particular, the user notification screen 500 is presented by a computing device 502 (e.g., portable electronic device). The user input screen 500 informs the contactee that "Jim Jackson" has called twice today and enables the user to conveniently specify a relationship level (e.g., Tier group) for "Jim Jackson". As shown in FIG. 5, the contactee has designated "Jim Jackson" as a close friend.

Figure 6:
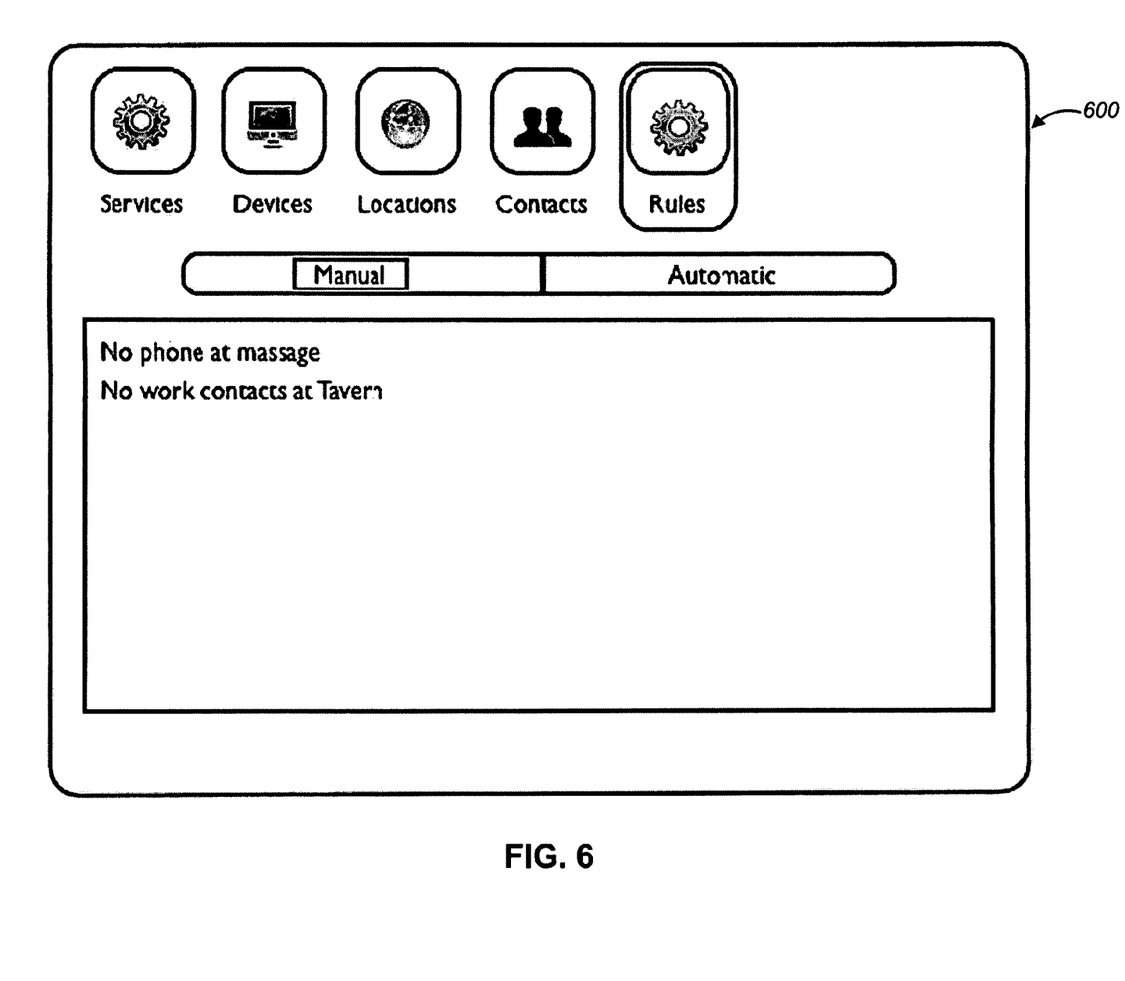
FIG. 6 is an exemplary rule screen according to one embodiment of the invention.
Figure 7:
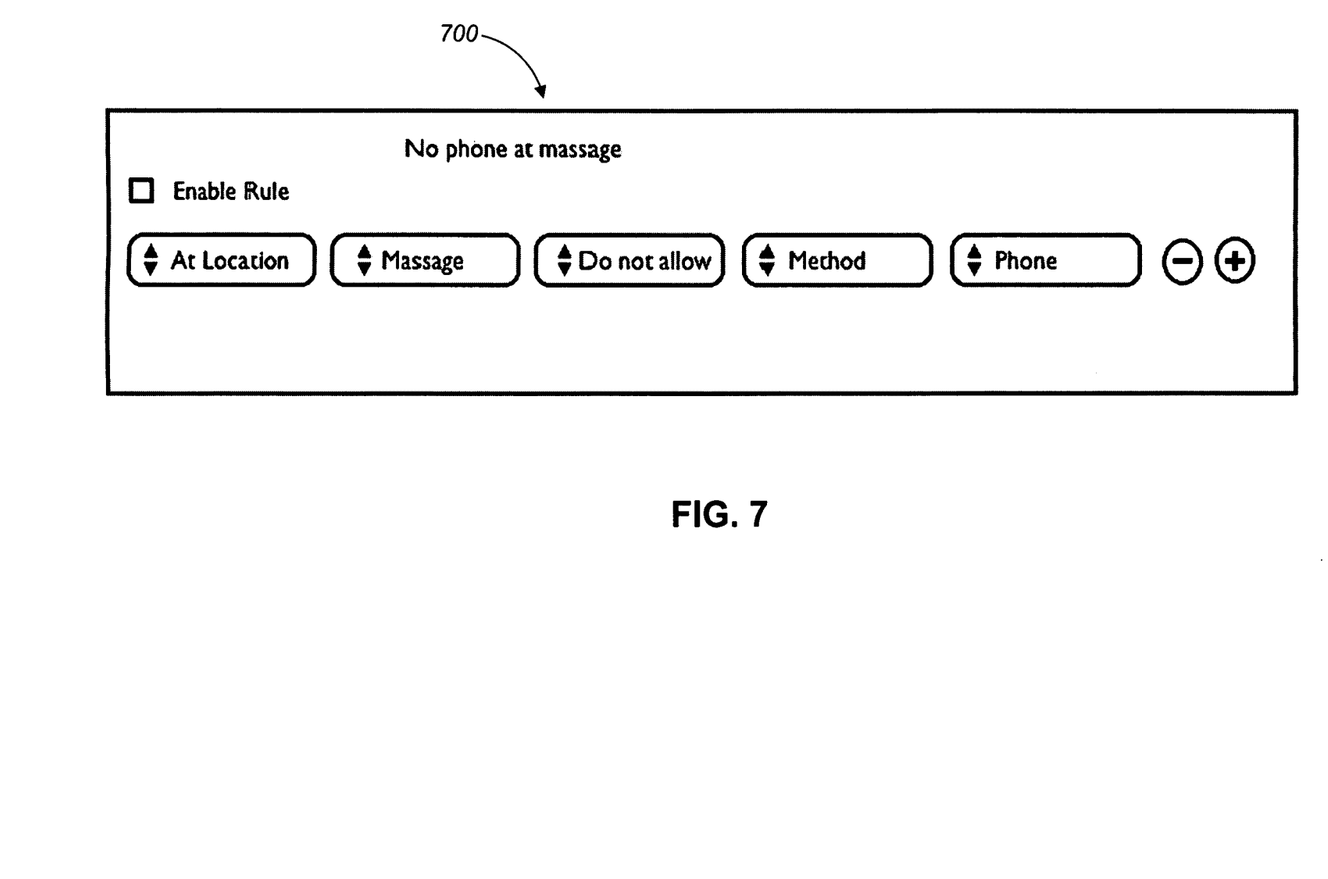
FIG. 7 is an exemplary rule creation screen according to one embodiment of the invention.

FIG. 6 is an exemplary rule screen 600 according to one embodiment of the invention. The rule screen 600 can enable a user to view, modify or create rules used by the system (100). The rules can be default rules or rules automatically created by the system (100). Existing rules can be modified by a user. A user can also manually create rules. FIG. 7 is an exemplary rule creation screen 700 according to one embodiment of the invention. Through user selections of location, activity, method of contact, device and/or access control, one or more rules can be manually created for use by the system (100).

System Requirements

For the above system (100) to work seamlessly, it is preferred, although not necessary, that both the contactee (106) and the contactor have software that supports the contacting service and can perform the above-described operations. For example, if the contactor (116) lacks the software on his communication device, the system (100) can still send back a message to the contactor (116) with the preferred method for contacting the contactee (106), which may also include an email address, a home phone number, and so on, if the contactor (116) does not have that information.

One example of a device that can be equipped with software to support the above-mentioned operations is the iPhone™, manufactured by Apple Inc. of Cupertino, Calif. The iPhone contains, among other things, calendar software, a GPS device, telephone and SMS functionality, web browsing capabilities, email, and so on.

In some embodiments, as described above, each contacting device can add information to the contacting service (102). In other embodiments, the communication device, such as the iPhone™ can gather information from all the devices of potential contactees, aggregate the information, and send the aggregated information to the contacting service (102). The above functionality can also be integrated with other services, such as the Microsoft Exchange server, by Microsoft Inc. of Redmond, Wash., which is an integrated email and calendar application that can send information through a cellular or wireless network and automatically update users' calendar without email notifications.

Although the system (100) described herein has been described as a public system, it can also be implemented as a private system, for example, within a corporation where only the employees may use the system (100). It can also be implemented as a peer-to-peer system, where each contactee (106) on an individual basis defines which contactors (116) should have access to the contacting service (102).

Furthermore, the contacting service (102) does not have to be implemented as a remote service. The contacting service (102) can also be implemented on the communication device itself, such as a user's mobile phone or computer. Typically, the contactor (116) would reach the mobile phone of the contactee (106) and all the processing would occur there, and only the end result (i.e., the appropriate way of contacting the contactee (106)) would be sent to the contactor (116). While this implementation may alleviate any privacy concerns, as no personal information would be transmitted anywhere, it might be somewhat slower than a remote service, as the remote service could receive information from multiple contacting devices.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor. The methods of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such mass storage devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices, such as a keyboard, a pointing device (e.g., a mouse or a trackball), a microphone, a touch-sensitive display, a transducer card reader, a magnetic or optical reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described methods. Such information, which is often represented as a sequence of instructions to be executed using the processor, may be received from and outputted to the network. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system or apparatus may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the system may serve other purposes, such as security purposes. It would be possible for the system to detect a deviation from a user's typical behavior, say that the user is not scheduled to be on vacation and does not answer telephone calls or emails. This could trigger an alert with a family member, security personnel, a manager, and so on, since there may be something unusual going on.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for determining a preferred method of contacting a contactee, the method comprising:

providing a contacting service, the contacting service being connected to a network and having a processor being operable to:

collect data pertaining to a contactee from one or more contacting devices connected to the network, the collected data including location information associated with the contactee;

store the collected data; the collected data being based upon contactee activities;

wherein the one or more contacting devices are located in a plurality of different physical locations, and the collecting of data from the one or more contacting devices occurs dynamically;

receive a request from a contactor to initiate contact with the contactee;

determine, based on multiple variables derived from the collected data, a preferred method of contacting the contactee, wherein a weight is assigned to each of the multiple variables, the weights indicating an importance of each variable compared to the other variables in determining the preferred method of contacting the contactee;

establish contact between the contactor and the contactee using the preferred method automatically without requiring any further input from the contactor, wherein the contactor is unaware of the preferred method of contact;

identify a new location visited by the contactee, wherein the location is not associated with the previously stored location information; and request information from the contactee about how the contactee should be contacted at the identified new location.

2. The computer-implemented method of claim 1, wherein the request received from the contactor comprises: receiving a selection of a contactee, the selection including an identification of the contactee but no specifics as to which contact method to use; and transmitting the selection of the contactee over the network to the contacting service.

3. The computer-implemented method of claim 1, wherein the contacting service is further operable to: receive registration information from a contactee; and store the registration information with the contacting service.

4. The computer-implemented method of claim 3, wherein the registration information includes one or more of: a list of devices to be used as contacting devices, a list of information sources, or a set of rules and priorities for various contactors.

5. The computer-implemented method of claim 4, wherein the contacting devices include one or more of: computers, global positioning system devices, mobile telephones, office phones, home phones, or web cameras.

6. The computer-implemented method of claim 4, wherein the information sources include one or more of: one or more electronic calendars, or a status of a contactee's email.

7. The computer-implemented method of claim 4, wherein the set of rules and priorities includes one or more of: associations of contactors with groups and rules for how each group is processed, rules for preferred methods for contactors to initiate contacts with the contactee when the contactee is in a particular physical location, or control parameters for one or more devices on which the contactee can be reached.

8. The computer-implemented method of claim 1, wherein the location information is manually inputted by the contactee; and wherein location information associated with the identified location is requested from the contactee.

9. The computer-implemented method of claim 1, wherein the contacting service is a secure contacting service, implemented at a remote server that is remotely located from the contactor and the contactee.

10. The computer-implemented method of claim 1, wherein the contacting service is a local service implemented on one or more devices used by the contactor and/or contactee.

11. The computer-implemented method of claim 1, wherein establishment of contact comprises: informing the contactor of the preferred method of contacting the contactee.

12. The computer-implemented method of claim 1, wherein establishment of contact comprises:

sending a message to the contactor, the message indicating a preferred way of contacting the contactee; and receiving a contact initiation from the contactor in accordance with the preferred way specified in the message.

13. A computer program product, stored on a non-transitory machine-readable medium, including at least executable computer program code for determining a preferred method of contacting a contactee, said computer program product comprising:

computer program code for collecting data pertaining to a contactee from one or more contacting devices connected to a network, the collected data including location information associated with the contactee;

computer program code for storing the collected data, the collected data being based upon contactee activities;

wherein the one or more contacting devices are located in a plurality of different physical locations; and collecting data from the one or more contacting devices occurs dynamically;

computer program code for assigning a weight to each of the available multiple variables, the weights indicating an importance of each variable compared to the other variables in determining the preferred method of contacting the contactee;

computer program code for receiving a request from a contactor to initiate contact with a contactee;

computer program code for determining, based on multiple variables derived from the collected data, a preferred method of contacting the contactee;

computer program code for establishing contact between the contactor and the contactee using the preferred method automatically without requiring any further input from the contactor, wherein the contactor is unaware of the preferred method of contact;

computer program code for identify a location visited by the contactee wherein the location is not associated with the previously stored location information; and computer program code for requesting information from the contactee about how the contactee-should be contacted at the identified location.

14. A computer-implemented method for determining a preferred method of contacting a contactee, the method comprising:

providing a contacting service, the contacting service being connected to a network and having a processor being operable to:

collect data pertaining to the contactee from one or more contacting devices connected to the network; the data including location and activity information pertaining to the contactee; store the collected data;

wherein the one or more contacting devices are located in a plurality of different physical locations, and the collecting of data from the one or more contacting devices occurs dynamically;

receive a request from a contactor to initiate contact with a contactee;

determine, based on multiple variables derived from the collected data, a preferred method of contacting the contactee, wherein a weight is assigned to each of the multiple variables, the weights indicating an importance of each variable compared to the other variables in determining the preferred method of contacting the contactee;

store location information for the contactee, wherein the stored location information is manually inputted by the contactee;

identify a location visited by the contactee, wherein the location is not associated with previously stored location information; and request information from the contactee about how the contactee should be contacted at the identified location;

establish contact between the contactor and the contactee using the preferred method; wherein the contactor is unaware of the preferred method of contact.

15. The computer-implemented method of claim 14, wherein the request received from the contactor comprises:

receiving a selection of a contactee, the selection including an identification of the contactee but no specifics as to which contact method to use; and transmitting the selection of the contactee over the network to the contacting service.

16. A computer-implemented method for determining a preferred method of contacting a contactee, the method comprising:

a contacting service, the contacting service being connected to a network and having a processor being operable to:

collect data pertaining to a contactee from one or more contacting devices connected to the network; the collected data including location and activity information pertaining to the contactee;

store the collected data;

wherein the one or more contacting devices are located in a plurality of different physical locations, and the collecting of data from the one or more contacting devices occurs dynamically;

receive a request from a contactor to initiate contact with the contactee;

determine, based on multiple variables derived from the collected data, a preferred method of contacting the contactee, wherein a weight is assigned to each of the multiple variables, the weights indicating an importance of each variable compared to the other variables in determining the preferred method of contacting the contactee;

store location information for the contactee, wherein the stored location information is manually inputted by the contactee;

identify a location visited by the contactee, wherein the location is not previously stored location information;

request and store location information from the contactee about the identified location;

request information from the contactee about how the contactee should be contacted at the identified location;

automatically establish contact between the contactor and the contactee using the preferred method without requiring any further input from the contactor, wherein the contactor is unaware of the preferred method of contact.

17. The computer-implemented method of claim 16, wherein the contacting service is a secure contacting service, implemented at a remote server that is remotely located from the contactor and the contactee.

18. The computer-implemented method of claim 16, wherein the contacting service is a local service implemented on one or more devices used by the contactor and/or contactee.

* * * * *